United States Patent
Bermudez Rodriguez et al.

(10) Patent No.: US 10,318,919 B2
(45) Date of Patent: Jun. 11, 2019

(54) SMART SHELVES FOR RETAIL INDUSTRY

(71) Applicant: INTERNATIONAL BUSINESS MACHINES CORPORATION, Armonk, NY (US)

(72) Inventors: Sergio A. Bermudez Rodriguez, Boston, MA (US); Hendrik F. Hamann, Yorktown Heights, NY (US); Levente Klein, Tuckahoe, NY (US); Theodore G. van Kessel, Millbrook, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 577 days.

(21) Appl. No.: 15/040,252

(22) Filed: Feb. 10, 2016

(65) Prior Publication Data

US 2017/0228686 A1   Aug. 10, 2017

(51) Int. Cl.
*G06Q 10/08* (2012.01)
*G06Q 10/06* (2012.01)

(52) U.S. Cl.
CPC ..... *G06Q 10/087* (2013.01); *G06Q 10/06315* (2013.01)

(58) Field of Classification Search
None
See application file for complete search history.

(56) References Cited

U.S. PATENT DOCUMENTS

| | | | |
|---|---|---|---|
| 6,163,250 A | 12/2000 | Moskowitz | |
| 6,725,206 B1 | 4/2004 | Coveley | |
| 8,260,456 B2 * | 9/2012 | Siegel | G06Q 10/08 221/4 |
| 8,442,878 B2 | 5/2013 | Henry | |
| 8,751,318 B2 | 6/2014 | Kim et al. | |
| 9,109,943 B2 | 8/2015 | Mager et al. | |
| 2003/0122455 A1 * | 7/2003 | Caldwell | A47B 57/00 312/6 |

(Continued)

OTHER PUBLICATIONS

Gupta, el at., "Analytical Model for Automating Purchases using RFID-enabled Shelf and Cart", International Journal of Information and Computation Technology, Jun. 2014, pp. 537-544, vol. 4, No. 5.

*Primary Examiner* — Thomas L Mansfield
(74) *Attorney, Agent, or Firm* — Tutunjian & Bitetto, P.C.; Vazken Alexanian

(57) ABSTRACT

A system and method are provided. The system includes a set of smart shelves. Each of the smart shelves has a mesh arrangement of sensors that include strain sensors, photodetectors, microphones, and spillage sensors placed on a bottom thereof to form a sensor mesh layer for generating a signal representative of a product count for a given product to be sold from a corresponding one of the smart shelves. The system further includes a data processing system for transforming the signal from each of the smart shelves into a product count value therefor. The system also includes a set of video displays for displaying characteristics of the given product to be sold from each of the smart shelves. The system additionally includes a set of wireless radios for transmitting the characteristics of the given product to be sold from each of the smart shelves to the set of video displays.

20 Claims, 10 Drawing Sheets

(56) References Cited

U.S. PATENT DOCUMENTS

| | | | |
|---|---|---|---|
| 2005/0086133 A1* | 4/2005 | Scherer | G06Q 10/087 |
| | | | 705/28 |
| 2005/0171854 A1 | 8/2005 | Lyon | |
| 2007/0050271 A1* | 3/2007 | Ufford | G06Q 10/087 |
| | | | 705/28 |
| 2010/0101317 A1* | 4/2010 | Ashrafzadeh | G01F 23/0061 |
| | | | 73/149 |
| 2012/0310744 A1* | 12/2012 | Kim | G06Q 30/02 |
| | | | 705/14.65 |
| 2014/0183269 A1* | 7/2014 | Glaser | G06F 21/32 |
| | | | 235/492 |

\* cited by examiner

SMART SHELVES FOR RETAIL INDUSTRY

BACKGROUND

Technical Field

The present invention relates generally to inventory management and, in particular, to smart shelves for retail industry.

Description of the Related Art

In many instances when people are shopping, they go to a retail store hoping to get all the items on the shopping list. It is quite common that items are missing or misplaced and it is very hard to get help or the unit from the shop assistants, as they may not be aware of the items location in the warehouse. In many cases customers are left with the choice of either going to a different retail store or to return the next day, hoping that the shelves will be restocked.

SUMMARY

According to an aspect of the present principles, a system is provided. The system includes a set of smart shelves. Each of the smart shelves in the set has a mesh arrangement of sensors that include strain sensors, photodetectors, microphones, and spillage sensors placed on a bottom thereof to form a sensor mesh layer for generating a signal representative of a product count for a given product to be sold from a corresponding one of the smart shelves. The system further includes a data processing system for transforming the signal from each of the smart shelves into a product count value therefor. The system also includes a set of video displays for displaying characteristics of the given product to be sold from each of the smart shelves. The system additionally includes a set of wireless radios for transmitting the characteristics of the given product to be sold from each of the smart shelves to the set of video displays.

According to another aspect of the present principles, a method is provided. The method includes generating a signal representative of a product count for a given product to be sold from a corresponding one of a set of smart shelves. Each of the smart shelves in the set has a mesh arrangement of sensors placed on a bottom thereof to form a sensor mesh layer. The mesh arrangement of sensors includes strain sensors, photodetectors, microphones, and spillage sensors. The method further includes transforming, by a data processing system, the signal from each of the smart shelves into a product count value therefor. The method also includes displaying, by a set of video displays, characteristics of the given product to be sold from each of the smart shelves. The characteristics of the given product to be sold from each of the smart shelves is transmitted to the set of video displays, by a set of wireless radios.

These and other features and advantages will become apparent from the following detailed description of illustrative embodiments thereof, which is to be read in connection with the accompanying drawings.

BRIEF DESCRIPTION OF DRAWINGS

The disclosure will provide details in the following description of preferred embodiments with reference to the following figures wherein.

DETAILED DESCRIPTION OF PREFERRED EMBODIMENTS

The present principles are directed to smart shelves for retail industry.

In an embodiment, a smart shelf for retail industry is provided that can automatically indicate the number of products present on the shelves allowing to digitize the number of physical units. It is to be appreciated that the terms "shelves" and "trays" are used interchangeably herein.

Figure 1:
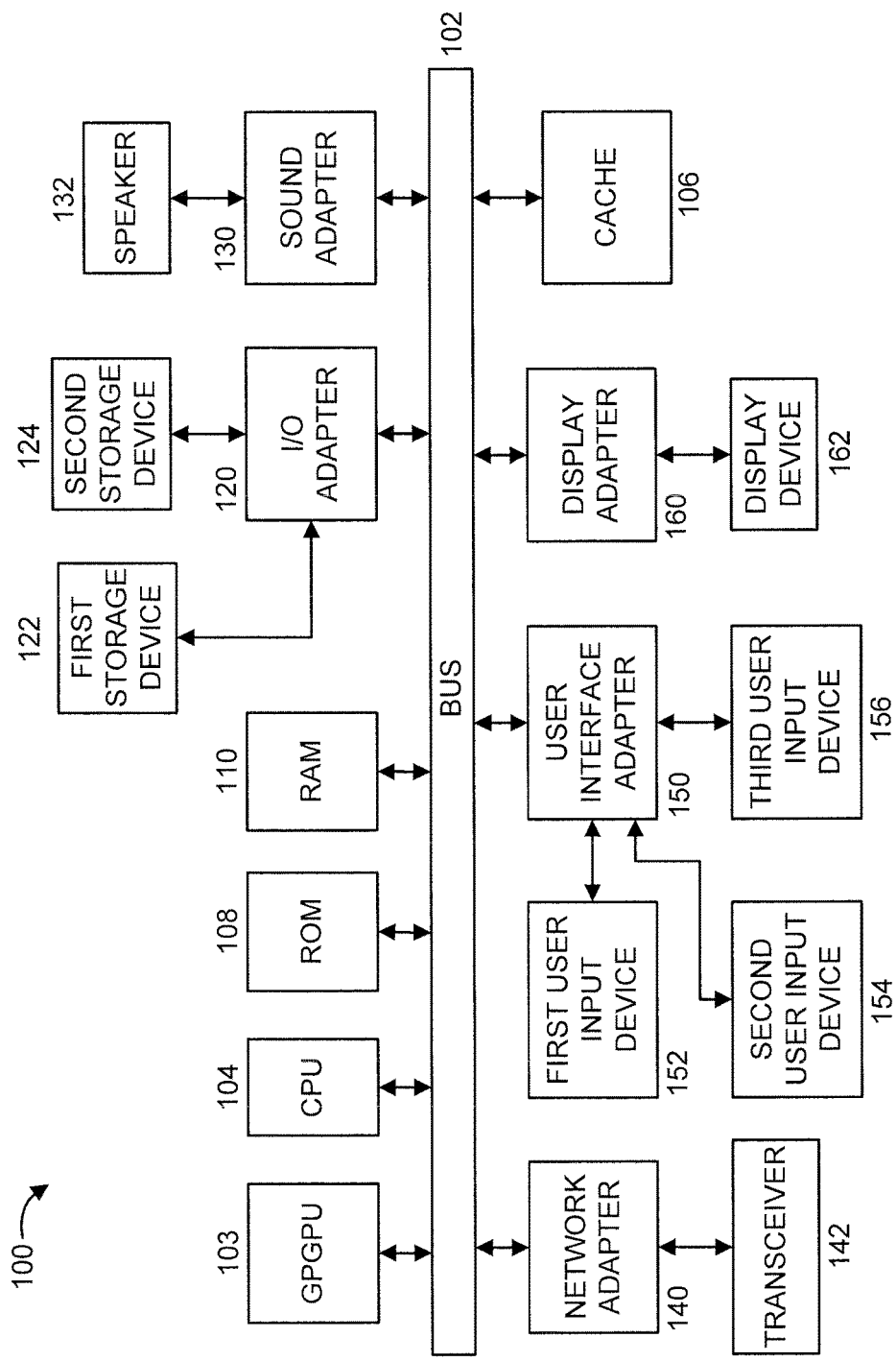
FIG. 1 shows an exemplary processing system 100 to which the present principles may be applied, in accordance with an embodiment of the present principles.

FIG. 1 shows an exemplary data processing system 100 to which the present principles may be applied, in accordance with an embodiment of the present principles. The data processing system 100 includes at least one processor (CPU) 104 operatively coupled to other components via a system bus 102. A cache 106, a Read Only Memory (ROM) 108, a Random Access Memory (RAM) 110, an input/output (I/O) adapter 120, a sound adapter 130, a network adapter 140, a user interface adapter 150, and a display adapter 160, are operatively coupled to the system bus 102.

A first storage device 122 and a second storage device 124 are operatively coupled to system bus 102 by the I/O adapter 120. The storage devices 122 and 124 can be any of a disk storage device (e.g., a magnetic or optical disk storage device), a solid state magnetic device, and so forth. The storage devices 122 and 124 can be the same type of storage device or different types of storage devices.

A speaker 132 is operatively coupled to system bus 102 by the sound adapter 130. A transceiver 142 is operatively coupled to system bus 102 by network adapter 140. A display device 162 is operatively coupled to system bus 102 by display adapter 160.

A first user input device 152, a second user input device 154, and a third user input device 156 are operatively coupled to system bus 102 by user interface adapter 150. The user input devices 152, 154, and 156 can be any of a keyboard, a mouse, a keypad, an image capture device, a motion sensing device, a smell sensing device, a light detector, a microphone, a device incorporating the functionality of at least two of the preceding devices, and so forth. Of course, other types of input devices can also be used, while maintaining the spirit of the present principles. The user input devices 152, 154, and 156 can be the same type of user input device or different types of user input devices.

The user input devices 152, 154, and 156 are used to input and output information to and from system 100.

Of course, the data processing system 100 may also include other elements (not shown), as readily contemplated by one of skill in the art, as well as omit certain elements. For example, various other input devices and/or output devices can be included in data processing system 100, depending upon the particular implementation of the same, as readily understood by one of ordinary skill in the art. For example, various types of wireless and/or wired input and/or output devices can be used. Moreover, additional processors, controllers, memories, and so forth, in various configurations can also be utilized as readily appreciated by one of ordinary skill in the art. These and other variations of the data processing system 100 are readily contemplated by one of ordinary skill in the art given the teachings of the present principles provided herein.

Figure 2:
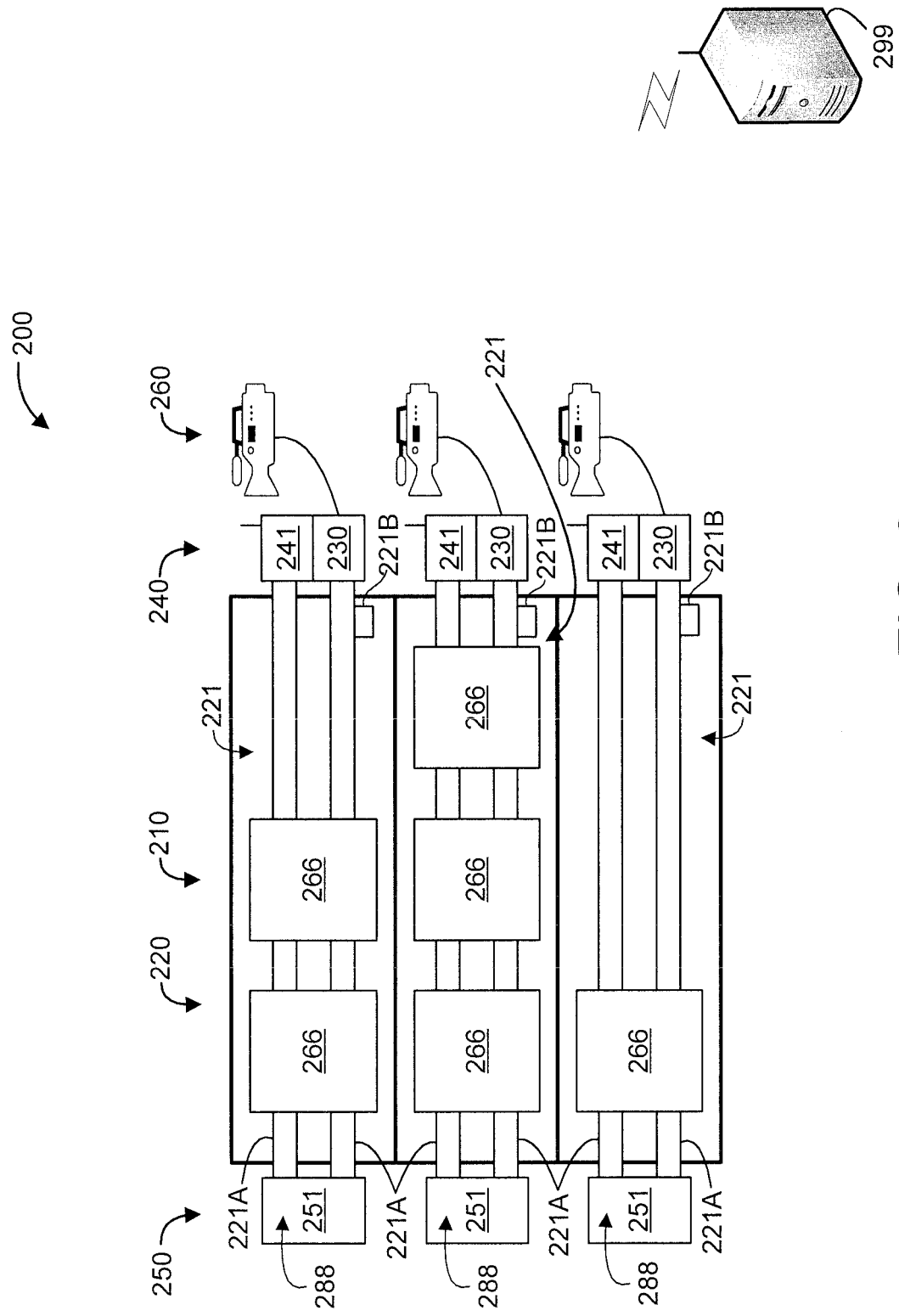
FIG. 2 shows an exemplary smart shelves system 200 for retail industry, in accordance with an embodiment of the present principles.

Moreover, it is to be appreciated that system 200 described below with respect to FIG. 2 is a system for implementing respective embodiments of the present principles. Part or all of data processing system 100 may be implemented in one or more of the elements of system 200. For example, data processing system 100 of FIG. 1 can be used to implement the data processing system 200 shown in FIG. 2.

Figure 5:
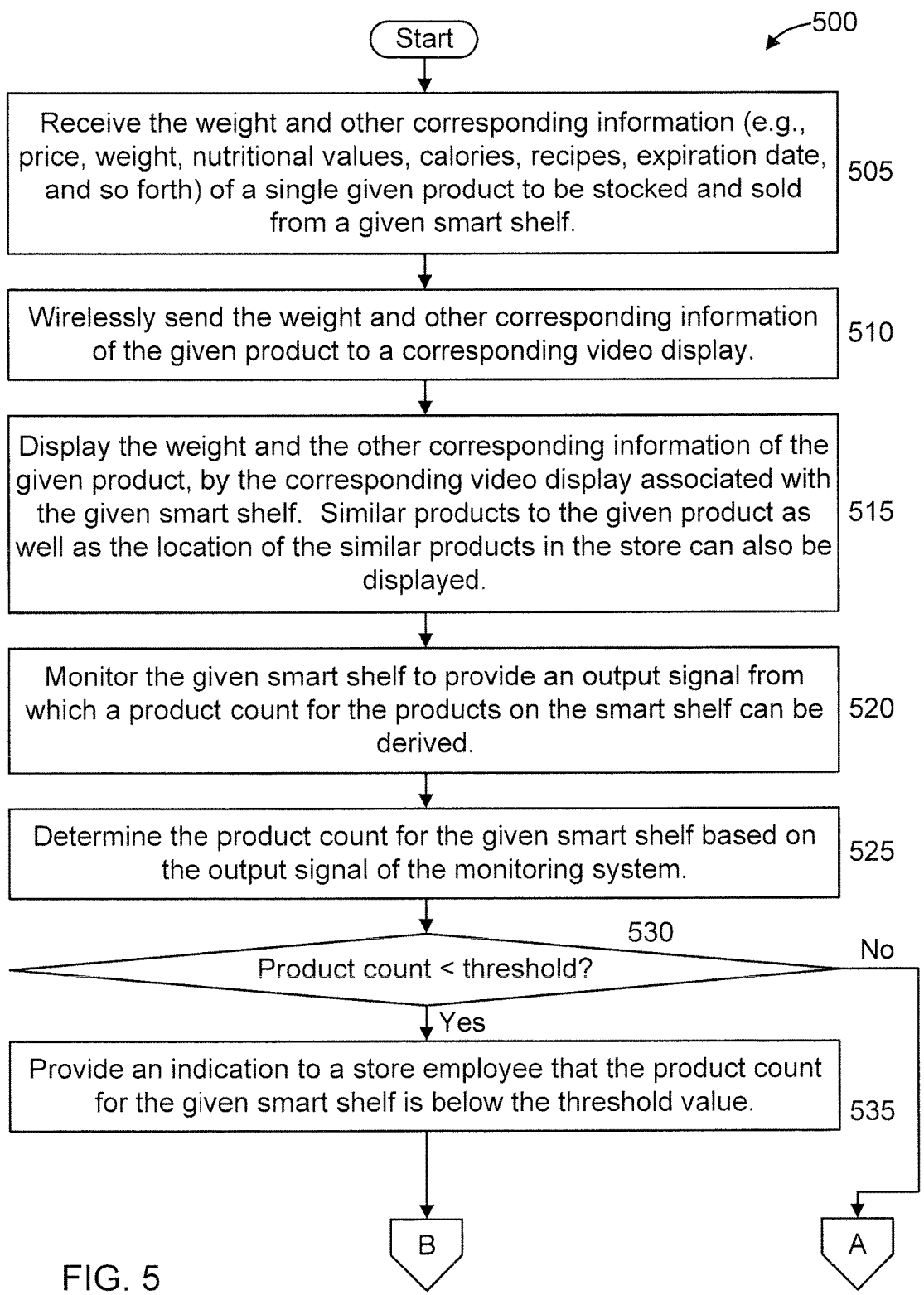
FIGS. 5-7 show an exemplary method 500 for implementing a smart shelves system, in accordance with an embodiment of the present principles.
Figure 6:
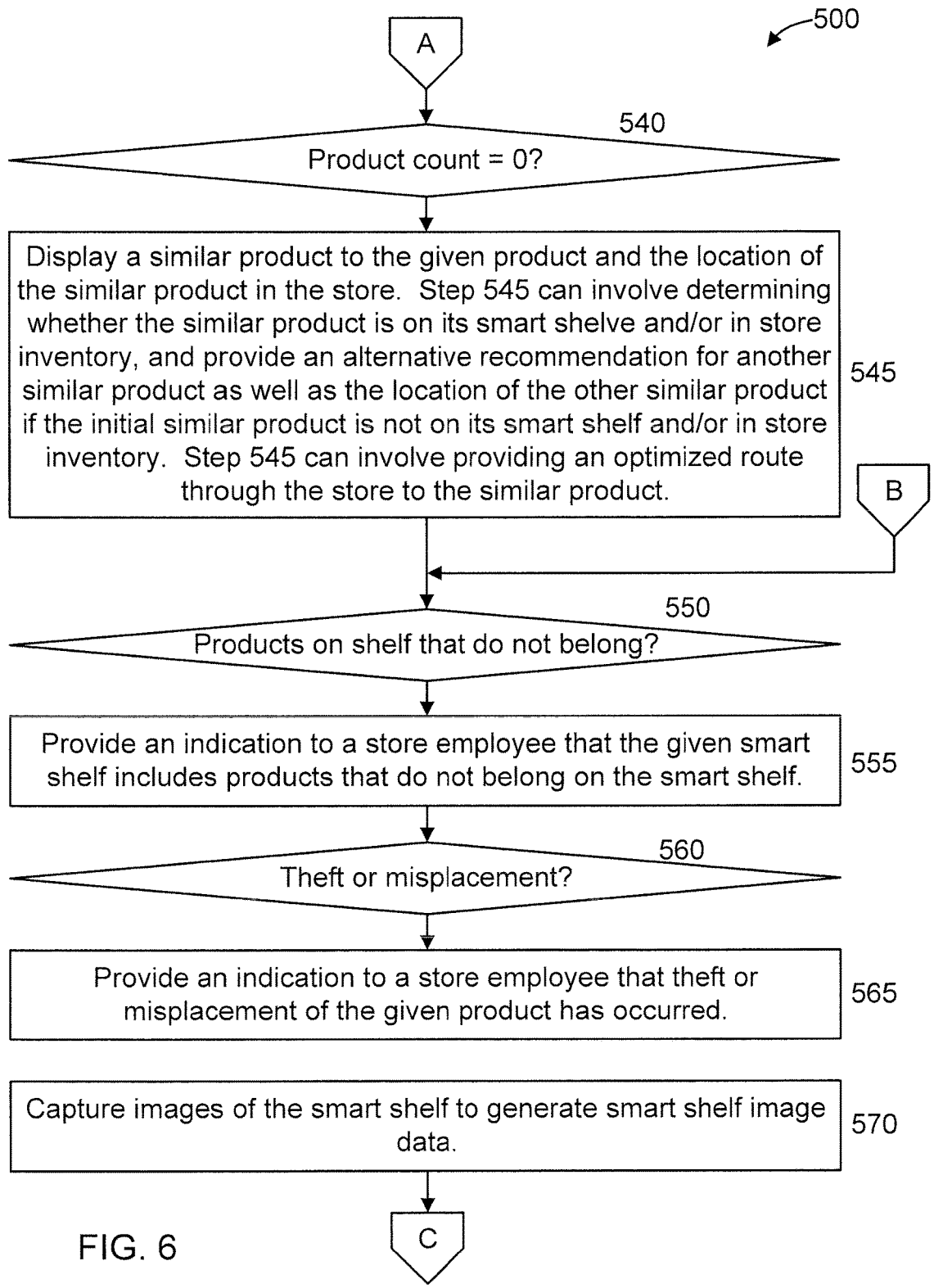
Figure 7:
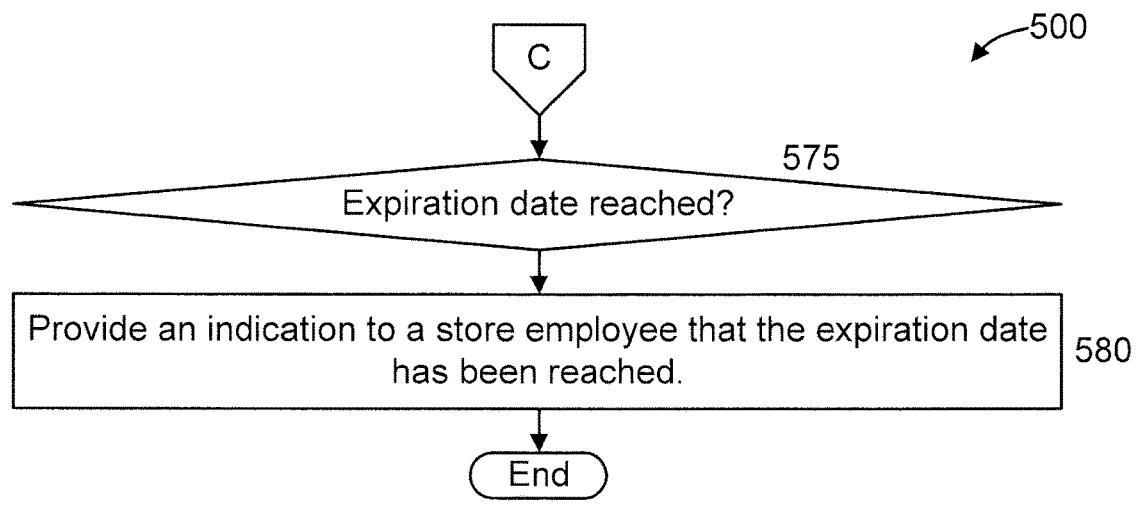
Figure 8:
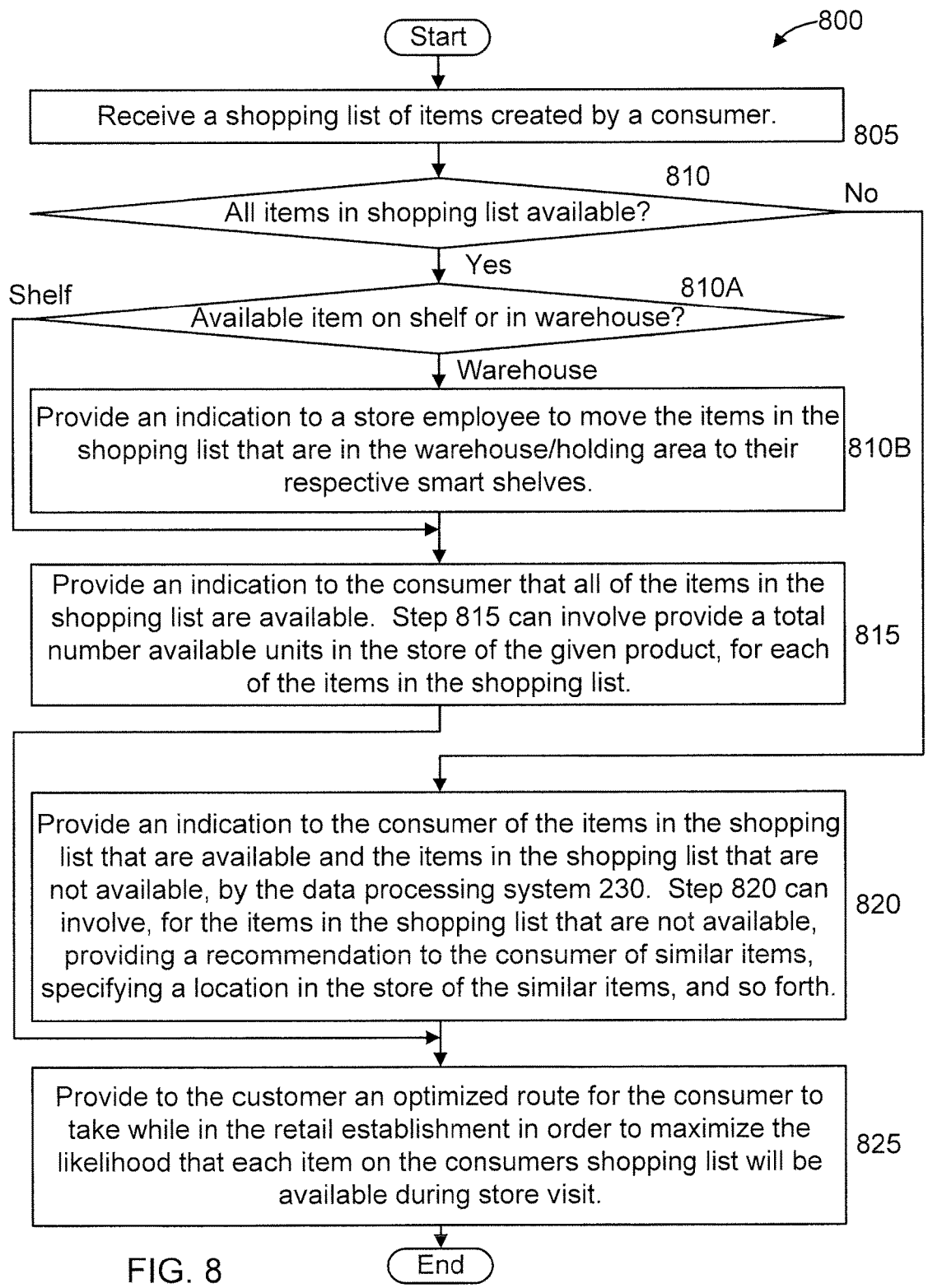
FIG. 8 shows an exemplary method 800 for direct communication between the smart shelves system and a consumer, in accordance with an embodiment of the present principles.

Further, it is to be appreciated that data processing system 100 may perform at least part of the method described herein including, for example, at least part of method 500 of FIGS. 5-7 and/or at least part of method 800 of FIG. 8. Similarly, part or all of system 200 may be used to perform at least part of method 500 of FIGS. 5-7 and/or at least part of method 800 of FIG. 8.

FIG. 2 shows an exemplary smart shelves system 200 for retail industry, in accordance with an embodiment of the present principles.

The smart shelves system 200 includes a set of smart shelves 210. It is to be appreciated that any reference to a set herein does not refer to a null set, but rather a set with at least one member. In the embodiment of the FIG. 2, the system 200 includes three adjacent smart shelves 210 with different items (boxes) 266 on the smart shelves 210. Of course, other numbers of smart shelves and other configurations thereof can also be employed in accordance with the teachings of the present principles, while maintaining the spirit of the present principles. For example, the smart shelves 200 can be implemented as a single unit or can include multiple trays that can accommodate different products.

In the embodiment of FIG. 2, each shelf includes a monitoring system 220, a data processing system 230, a communication system 240, a video display system 250, and a camera 260. While shown as separate systems/elements, two or more of the preceding systems/elements can be combined/integrated into a single system/element, as readily appreciated by one of ordinary skill in the art. These and other variations, some of which are further provided herein below, are readily contemplated by one of ordinary skill in the art, while maintaining the spirit of the present principles.

In the embodiment of FIG. 2, the data processing system 230 on each shelf can interface with a store central server 299 which can control various store systems (e.g., personal scheduling, personal information, lighting, security, and so forth) and/or otherwise monitor items in the store. In an embodiment, the store central server 299 can provide the data processing system with the relevant telephone numbers or access information (e.g., radio frequency, email address, pager, short messaging service (SMS), audio system, and so forth) for a store employee such as a store manager or stock personal in order to apprise them of certain situations such as low stock, and so forth. Thus, in the case of FIG. 2, the data processing system 230 and the store central server 299 can be considered to be different processing entities. However, in other embodiments, the data processing system 230 can be included in and/or otherwise implemented by the store central server 299 and can communicate with the store central server 299.

The video display system 250 on each shelf includes a video display 251. The video display 251 can show item characteristics such as, for example, but not limited to, price, weight, chemical freshness determined by color or methane emission, nutritional values, calories, recipes, expiration date, and so forth. The video display 251 can also show information of a current promotion or other products that are similar and other products that may be of interest. For example, if a consumer is standing in front of a shelf that has hammers on the shelf, a corresponding video display may also indicate information relating to nails.

The monitoring system 220 on each shelf includes a sensing system 221. In an embodiment, the sensing system 221 is implemented using a set of strain sensors, a set of photodetectors and/or a set of sound sensors (e.g., microphones) and/or a set of leak detectors and/or a set of color sensors 221A and/or a set of infrared sensors 221B.

In an embodiment, each of the shelves 210 can include a strain sensor 221A. For example, a strain sensor 221A can be installed at and/or otherwise integrated with the bottom part of a smart shelf. As items are placed on top of a smart shelf, the sensor voltage output of the strain sensor 221A is an indicator of the total weight and number of items on that smart shelf. The voltage signal strength scales with the total weight of items (responsive to vertical deflection), decreasing when one item is removed from the shelf. When the voltage signal of the strain sensor 221A is below a certain threshold voltage (e.g. corresponding to one or two items on the shelf; of course, other numbers of items can also be used), a signal is sent through the communication system 240 to the data processing system 230.

In an embodiment, the set of photodetectors 221A can be integrated into the sensing sheet. The photodetectors may have a filter that will indicate that a certain item with specific color is on the shelf. The voltage output of the photodetectors is proportional with the type of color present on the packaging box of the item. If the item show a slow trend of change in color (for example banana or orange juice expiring on the shelf and turning from yellow to brownish), the sensor will indicate that the item is reaching its shelf lifetime. Similarly, the photodetectors will monitor the freshness of a milk in a plastic jar that is coagulating and changing color.

In an embodiment, the set of microphones 221A can monitor for popping sounds such as when a container explodes or expands due to its contents being compromised or handled improperly on the shelves. This sensor can be composed of strips of piezoelectric material that generate a signal once it picks up small vibrations. The piezoelectric layer can be printed or added as a material that was peeled off from another substrate and added as a new layer or small strip to the sheet.

In an embodiment, the set of liquid leak detectors 221A can determine if one of the packages is damaged such that it is leaking a liquid.

Thus, each of the smart shelves has an integrated sensing layer (implemented by, e.g., the strain, photodetector, microphone, and color sensors 221A) attached to the shelf that can count the number of items on the shelf. In an embodiment, one possible implementation of an object counting sensor can involve configuring and/or otherwise arranging the strain sensors 221A in a checkerboard pattern.

The various sensor layers can be integrated into the same sheet as overlapping layers where one layer will be a strain detector, another layer will be a photodetector, and yet another layer will be an acoustic sensor. Layers can be printed or added externally and the number of required layers will be dependent on the items that needs to be detected.

In one embodiment, the strain sensors 221A can include a patterned foil laminated to the bottom of a smart shelf. The laminated foil can have circuits printed on the foil using silicon, germanium, and/or other materials that make it sensitive to different phenomena. For example, chemical sensing can be achieved when tin oxide is printed on top of a transistor, since the amount of current flowing through the circuit will increase when the methane level is increasing. Similarly, a light detector can be created at the junction of two dissimilar materials such as, for example, Silicon/Germanium Schottky junction to detect light in a specific spectral band that is associated with the merchandise packaging color. Strain in this case is computed by measuring the change in resistance of the foil in response to strain along the shelf using an analog to digital conversion and signal processing methods as known in the art. For example, a PolyVinylidene DiFluoride (PVDF) coated pliable Kapton foil that would generate a voltage output if a product unit were placed on the top can be used as one implementation of a strain sensor in accordance with the present principles. Of course, other insulating materials can be used in place of or in addition to PVDF, and other conducting materials can be used in place of or in addition to Kapton. The number of layers that can be printed from different materials will be dependent on the applications.

Figure 9:
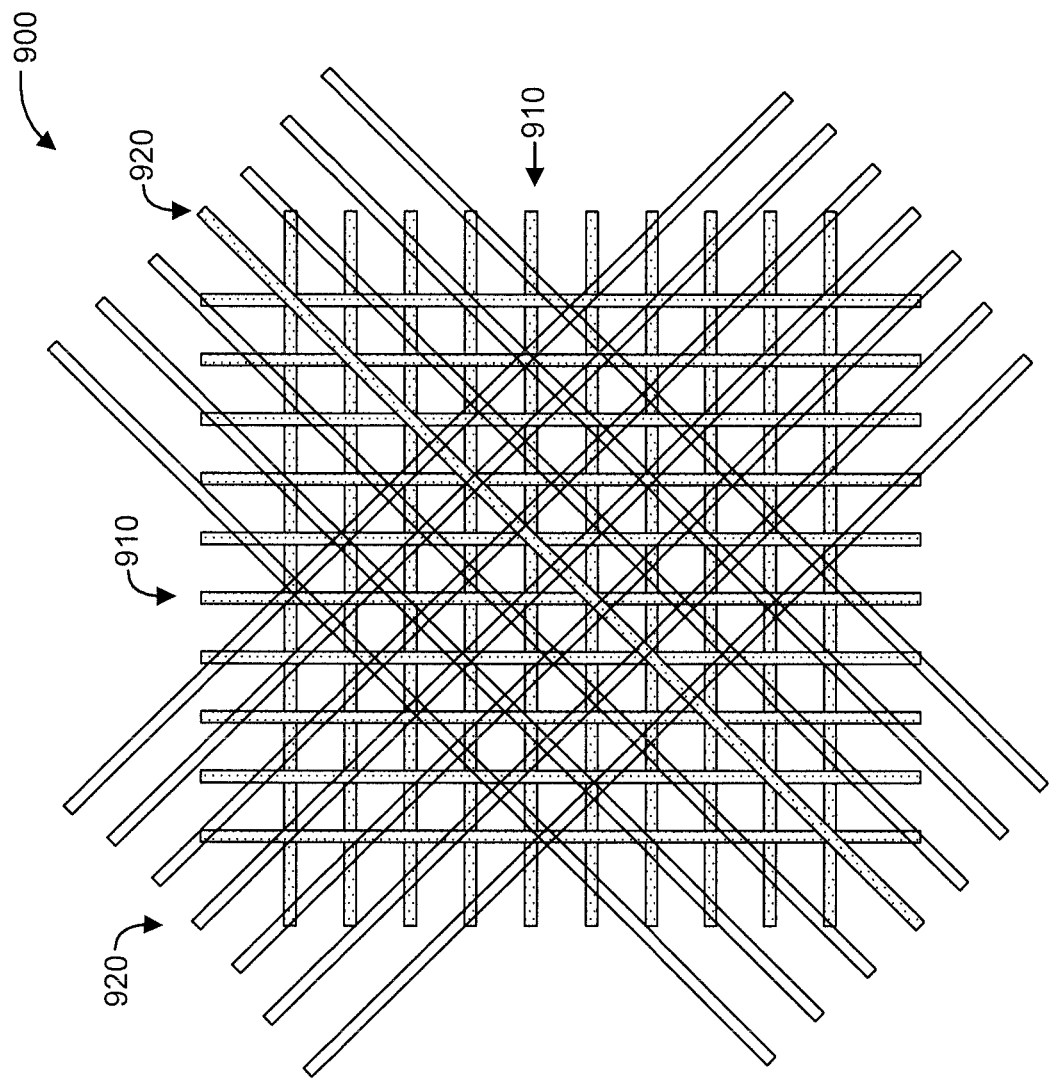
FIG. 9 shows an exemplary arrangement of a two-dimensional sensor system 900 in accordance with an embodiment of the present principles.
Figure 10:
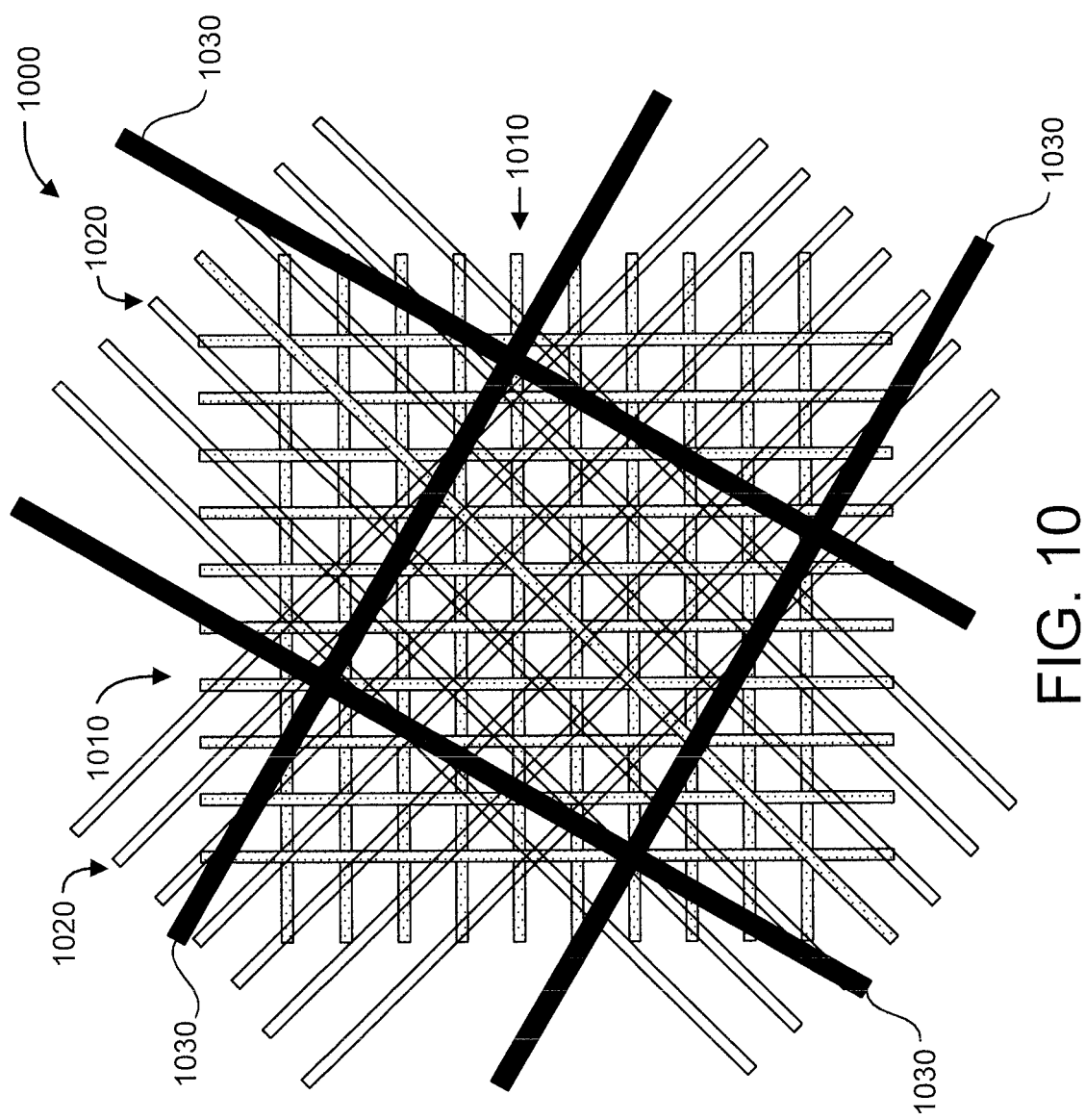
FIG. 10 shows another exemplary arrangement of a two-dimensional sensor system 1000 in accordance with an embodiment of the present principles.

The layers can be perpendicular strips forming a cross bar structure that can have arbitrary orientations (as shown in FIGS. 9 and 10).

Figure 3:
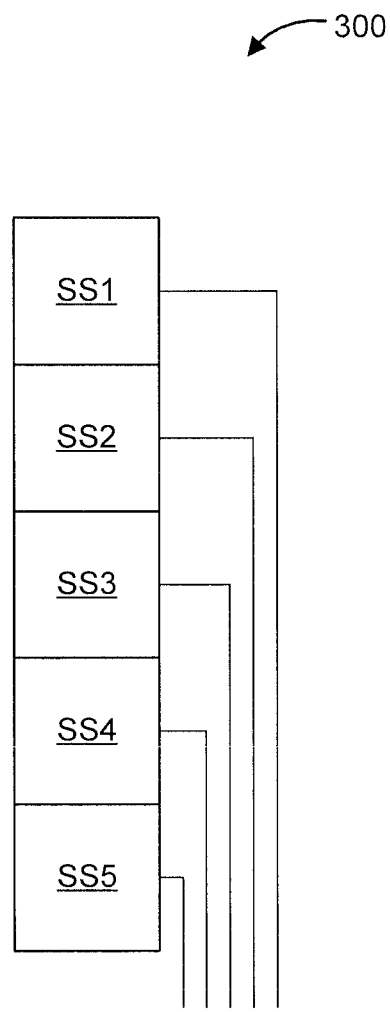
FIG. 3 shows an exemplary arrangement of a linear strain sensor system 300 in accordance with an embodiment of the present principles.
Figure 4:
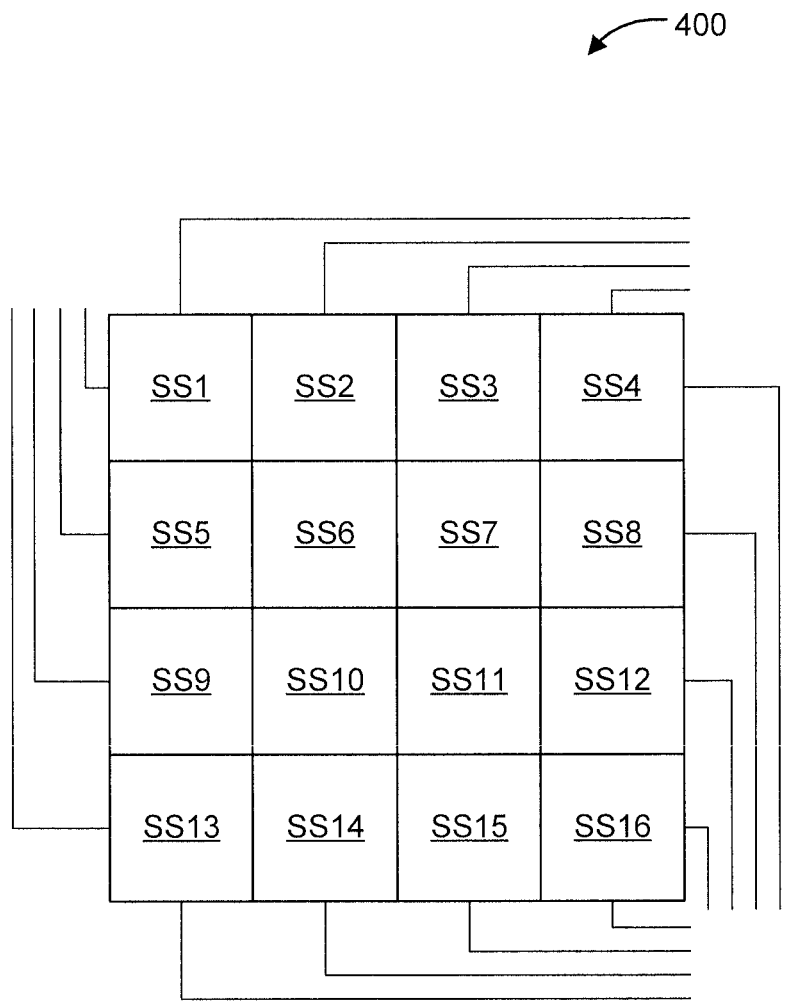
FIG. 4 shows an exemplary arrangement of a two-dimensional strain sensor system 400 in accordance with an embodiment of the present principles.

Various strain sensors are described in further detail below with respect to two exemplary arrangements of the same, as shown in FIGS. 3 and 4. It is to be appreciated that while the embodiment of FIG. 2 shows the monitoring system 220 implemented using strain sensors, other types of monitoring systems and technologies can also be used in accordance with the teachings of the present principles, while maintaining the spirit of the present principles. For example, in an embodiment, the monitoring system 220 can include multiple discrete elements to give a desired spatial resolution to the shelf sensor (and can, thus, also provide an indication of a messy smart shelf where the items placed thereon are in a haphazard arrangement as opposed to the conventional one-behind-another approach typically used to stock shelves).

In an embodiment, the communication system 240 on each self includes a wireless radio 241. The wireless radio 241 can wirelessly transmit data using any of Bluetooth, spread spectrum radio, mesh radio, ZigBee, Global System for Mobile communications (GSM), Code Division Multiple Access (CDMA), General Packet Radio Service (GPRS), Wideband Code Division Multiple Access (WCDMA), Enhanced Data rates for GSM Evolution (EDGE) (also known as Enhanced GPRS (EGPRS), and CDMA2000. Of course, other types of wireless communications can also be used in accordance with the teachings of the present principles, while maintaining the spirit of the present principles. It is to be appreciated that while the embodiment of FIG. 2 shows a wireless implementation of the communication system 240, the present principles are not limited to the same and, thus, other implementations of the communication system can be in the form of a wired system or a hybrid system involving both wireless and wired communication.

The data processing system 230 on each shelf can determine the product count on that smart shelf from the signal(s) and/or voltage(s) provided by the strain sensors 221A, thus transforming the signal(s) and/or voltage(s) to a numerical product count value. The data processing system achieves the product count by knowing in advance the weight of products that are intended to be placed and sold from the smart shelf. In an embodiment, the weight of the products can be determined in advance from the product itself or from another source (e.g., the manufacturer's website and so forth) and then inputted by a person, or can be determined automatically from the other source (e.g., the manufacture's website and so forth). In an embodiment, the weight of a given product can be input to the system by initiating a registration mode, where a single item is placed on the shelf and a signal is generated representative of its weight. The weight determined (by the data processing system 230) during this registration mode can thereafter be used as a baseline measure to determine a product count for a given smart shelf. Moreover, this baseline can serve to determine if a product that does not belong on a given smart shelf is nonetheless present on that smart shelf. For example, if each product weighs a certain fixed amount, the more products on that shelf, the more the baseline value increases in increments of itself. Hence, if a current signal does not scale to a multiple of the baseline value but instead to some other value, it can be presumed that an item is on that smart shelf that does not belong on that smart shelf.

Similarly, the color of the units on the shelf can be monitored by recording the signal from the photodiodes and compare the voltage output from individual sensors and compare it with the value obtained from a database that indicate the response of the photodiode to the packaging color of that item.

Combining the color, sound, and weight of the items on the shelves can identify if a particular item is wrongly mixed with items that are expected on the shelves.

Additionally, an infrared sensor 221B can be integrated into the foil of the sensing system 221 to determine if a customer has stopped in front of the shelves. The infrared sensor 221B will sense a change in the temperature that is associated with a human body. The data from the infrared sensor 221B can be combined with a signal from a microphone that acquires sound when things are lifted from the shelves or placed on the shelves by a customer.

Analyzing the signal of a sensor before and after a change is detected on the shelves can be categorized in the following exemplary ways: an item removed from the shelf; an item was inspected by a customer; an item was lifted and a new item was placed on the shelves in exchange of the item; or a brand new item was placed on the shelves. The sensors will identify the above scenarios and determine the most likely outcome.

The data processing system 230 on each shelf can control, for example, a dashboard 288 shown on the video display 251. The dashboard 288 can specify information about the product. Such dashboard 288 can also be shown on a remote device accessible by a consumer. Such remote device can include, for example, but is not limited to, mobile devices, personal computers, laptops, personal digital assistants, phones, smart watches, and so forth) with extra information, for example it could indicate the unit count to the store manager and/or alert retail personal to replenish the shelf.

In an embodiment, the data processing system 230 on each shelf can monitor the number of items on that smart shelf and issue a warning to a store manager or other relevant store personal (e.g., stock persons) if the displayed supply is low, produce is approaching the end of its lifetime by changing color, or the wrong items were placed on the shelf.

In an embodiment, the data processing system 230 includes or is connected to a transmission device (e.g., wireless radio 241) in order to provide availability and other product information to a consumer. The transmission can occur, for example, over the Internet, and so forth. The transmission can be provided to a consumer, store employee, and so forth by the wireless radios 241 through the server 299 or directly from the wireless radios 241, depending upon the implementation.

In an embodiment, the availability of an item can be displayed for a customer who did not leave his house for shopping but is interested in knowing if all the items on his shopping list are available in the store. The customer shopping list can be stored on a mobile device or computer and transmitted to the store via wireless or wired technology, in order to check the store supply and provide an indication of whether all of the items are available on the shelves or in the stock or which items are available if not all are available.

The store system may also send information about alternative products in the store that share the same nutritional characteristics.

The store system may also send a list of all alternative product that are ranked based on freshness, the length of time that the item stayed in the store's storage area, the purchase rate of that item for that particular store, and so forth.

The store system may provide additional information like reviews, a ranking of the reviews, customer ratings of store items, and so forth.

The customer shopping list may be aggregated and sent to the store manager or associate about the potential interest of customers for a certain items in the store.

After available inventory is provided to a customer, if the customer's GPS signal indicates that the customer has arrived in the parking lot of the store, a warning is generated for the store manager or associate that items likely to be purchased by the customer may be low on the shelves and will trigger a message to replenish the shelves of particular items determined to be in low supply on the shelves.

In an embodiment, in the case when there are no extra products within the warehouse portion of the retail facility, the smart shelf can pick up item availability from adjacent wireless radios 241 and, through the video display 251, make a suggestion to customers located in front of the smart shelf for a similar item while at the same time displaying such item's characteristics and price. For example, in an embodiment, the similar item can be located nearby or in another (remote) part of the retail establishment, and the location of the similar item can also be displayed on the video display in front of the smart shelf of the missing item). In an embodiment, the data processing system 230 can provide to the customer an optimized route for the consumer to take while in the retail establishment in order to maximize the likelihood that each item on the consumers shopping list will be available during store visit. The optimized route can be the shortest route or the route that will likely enable the consumer to obtain everything on their list or can involve specifying, in order, the smart shelves whose inventory can likely be exhausted, in order that the consumer increases their chances of finding all those items before they are gone off the smart shelves.

The consumers shopping list can be provided to the data processing system 230 when, for example, the consumer is home or when the consumer first enters the establishment (of course, the latter incurring some processing time). The optimized route can be provided to the consumer via a device accessible and carried by the customer including, but not limited to, a personal digital assistant, a phone, a smart watch, and so forth.

In an embodiment, the data processing system 230 can keep track of a first alternative item (when an item is not available) and if the first alternate item is or becomes unavailable, the data processing system 230 can switch to another recommendation(s).

In an embodiment, the smart shelf system 200 can also be a shopping aid for remote customers who can check the number of available items in real-time via the Internet before going shopping.

In an embodiment, the smart shelf system, which can essentially perform inventory management, is coupled to the store payment registers to detect theft or misplacement of goods.

In an embodiment, the strain, color, microphone sensors 221A and/or the wireless radios 241 are battery powered. In an embodiment, the strain sensors 221A and/or the wireless radios 241 are powered from an Alternating Current (AC) connection. In an embodiment, the strain sensors 221A and/or the wireless radios 241 are powered by one or more energy scavenging methods including, but not limited to, vibration and ambient light. In the latter case, a solar panel may be mounted within the store (e.g., near the shelf), or even outside the store, to provide a power collecting source for the strain sensors 221A and/or the wireless radios 241. Moreover, while various methods of powering the strain sensors 221A and the wireless radios 241 have been described, such methods can also be readily applied to the other elements of smart shelves system 200 as readily appreciated by one of ordinary skill in the art.

The camera 260 on each shelf is connected to the data processing system 230 for that shelf, where the image data is processed in order to provide information to the video display 251 for that shelf. The camera 260 can be used to capture the selling rate, expiration date, customer reviews, which can then be displayed on the video displays. Alternatively, the expiration date for a given lot of packed out items can be entered on a smart shelf, wherein a count is then made relative to the inputted expiration date. Upon approaching or reaching the expiration date, a store employee can be notified. In this way, expired items can be removed from the smart shelves.

The photodetector or camera 260 on each shelf can also be used to capture color information thereafter processed by the data processing system 230. For example, in the case of bananas, brown and/or otherwise past ripe bananas can be identified based on color, in order for a store employee to be able to be notified by the system 200 of such condition. The color information can also be provided on the video displays where such color information would be useful to a consumer.

Additionally, the smart shelf image data provided by the cameras 260 can be used to determine the volume of a given product, rate of purchase by customers, which can thereafter be displayed on the video displays 251.

FIG. 3 shows an exemplary arrangement of a linear sensor system 300 in accordance with an embodiment of the present principles. FIG. 4 shows an exemplary arrangement of a two-dimensional strain sensor system 400 in accordance with an embodiment of the present principles. In another embodiment, the sensor can be strips running in parallel in multiple locations and at the crossing point between strips the sensing of strain, light, sound can be carried out. Either configuration as shown in FIGS. 3 and 4, or another type of configuration, can be used to implement the set of strain sensors 221A shown in FIG. 2. In the embodiment of FIG. 3, the linear strain sensor system 300 includes 5 strain sensors (SS1 through SS5). In the embodiment of FIG. 4, the two-dimensional strain sensor system 400 includes 16 strain sensors (SS1 through SS16).

Thus, the strain sensor systems 300 and 400 are used for monitoring the presence or absence of an item on the shelf. The output of the strain sensors 300 and 400 are used by the data processing system 230 to provide an object count based on the monitoring. The linear strain sensor system 300 can, for example, be used at the bottom of a tray. The two-dimensional (checkerboard) strain sensor 400 can be used across the whole shelf. When an object is placed on a unit cell (e.g., corresponding to any of strain sensor 1 (SS1) through SS5 in FIG. 3, and any of SS1 through SS16 in FIG. 4), the sensor output will have a finite voltage indicating presence or not for an item. From the interconnect of the sensor elements, the wireless sensor will know the location of the unit cell and can indicate if items are aligned one behind each other or are scattered on the shelve.

The wireless radios 241 that collect sensor information can form a mesh network and continuously communicate with the data processing system 230, with other wireless radios or with individual customer devices like cellphones. One such wireless sensor network can be employ Low Power Mote (LMT) technology that is geared tower low power communications, which can have a battery lifetime of 7 years and where each radio has localization capabilities. The localization capabilities allow the wireless sensor network to localize radios/sensors and track their location (in case a rack or shelf is moved, the radio will determine the new localization and can update the data schema). Of course, other types of wireless sensors can also be used in accordance with the teachings of the present principles, while maintaining the spirit of the present principles.

The mesh can be formed using various shapes. Moreover, the shapes can be adapted to the products that are intended to be sold from a given smart shelf, in order to determine if the proper item is on a smart shelf based on shape. In an embodiment, the mesh includes non-uniformly sized detection regions.

When the strain sensor signal is not zero, the video display 251 for a corresponding smart shelf can show characteristics of a product (price, weight, nutritional values, calories, recipes, expiration date, and so forth) and the wireless radio can report the number of products on the shelf to the data processing system 230. The uniformity of signal change is tracked. If the change in signal is too large or too low it may indicate that a different item may have been placed on the shelf. An alarm signal can be sent to the store manager to verify the compatibility in such a circumstance.

When the number decreases below a threshold value (for example 2), a warning can be issued to department store manager about the remaining number of units on the shelf, general information about the rate of sale for a product and how long until a shelf will be likely emptied.

In the case when the shelf becomes empty, the corresponding video display 251 will pick up a signal from neighboring wireless radios 241 and will display a recommendation about an alternative product, display the characteristics of the alternate product on the video display 251, and indicate the location of the alternate product in the store.

FIGS. 5-7 show an exemplary method 500 for implementing a smart shelves system, in accordance with an embodiment of the present principles.

At step 505, receive the weight and other corresponding information (e.g., price, weight, nutritional values, calories, recipes, expiration date, and so forth) of a single given product to be stocked and sold from a given smart shelf, by the data processing system 230.

At step 510, wirelessly send the weight and other corresponding information of the given product to a corresponding video display 251, by a wireless radio 241.

At step 515, display the weight and the other corresponding information of the given product, by the corresponding video display 251 associated with the given smart shelf. Similar products to the given product as well as the location of the similar products in the store can also be displayed, by the video display device.

At step 520, monitor the given smart shelf to provide an output signal from which a product count for the products on the smart shelf can be derived, by the monitoring system 220. In an embodiment, the monitoring is performed by any of strain sensors and/or color sensors and/or sound sensors and/or infrared sensors and/or photodetectors and/or microphones and/or leak detectors, which generate a voltage (or other output type) proportional to the number of products on the shelf.

At step 525, determine the product count for the given smart shelf based on the output signal of the monitoring system 220, by the data processing system 230.

At step 530, determine whether the product count for the given smart shelf is below a threshold value. If so, then the method proceeds to step 535. Otherwise, the method proceeds to step 550.

At step 535, provide an indication (notice, warning, and/or so forth) to a store employee (e.g., manager, stock person, and/or so forth) that the product count for the given smart shelf is below the threshold value.

At step 540, determine whether the product count for the given smart shelf is equal to zero. If so, then the method proceeds to step 545. Otherwise, the method proceeds to step 550.

At step 545, display a similar product to the given product and the location of the similar product in the store, by the corresponding video display 251. In an embodiment, step 545 can involve determining whether the similar product is on its smart shelve and/or in store inventory, and provide an alternative recommendation for another similar product as well as the location of the other similar product if the initial similar product is not on its smart shelf and/or in store inventory. In an embodiment, step 545 can involve providing an optimized route through the store to the similar product.

At step 550, determine whether any products that do not belong on the given smart shelf are nonetheless present on the shelf based on the output of the monitoring system 220, by the data processing system 230. If so, them the method proceeds to step 555. Otherwise, the method proceeds to step 560.

At step 555, provide an indication (notice, warning, and/or so forth) to a store employee (e.g., manager, stock person, and/or so forth) that the given smart shelf includes products that do not belong on the smart shelf, by the wireless radio 241.

At step 560, determine whether any theft or misplacement of the given product has occurred based on the product count and the amount of the given product already sold and the amount of the given product in a warehouse/holding area of the store. If so, then the method proceeds to step 565. Otherwise, the method proceeds to step 570.

At step 565, provide an indication (notice, warning, and/or so forth) to a store employee (e.g., manager, stock person, and/or so forth) that theft or misplacement of the given product has occurred.

At step 570, capture images of the smart shelf to generate smart shelf image data, by the corresponding camera 260.

At step 575, determine whether the expiration date of the given product has been reached. If so, then the method proceeds to step 580. Otherwise, the method proceeds to step 585. It is to be appreciated that the determination can be based on the expiration date as input at step 505, where a timer is set by the data processing system relative to the inputted expiration date. Alternatively or in supplement, the expiration date can be determined from the smart shelf image data. In the case of using the smart shelf image data, the expiration can be determined from the item itself as printed on the item and captured by the cameras or can be estimated from the smart shelf image data (e.g., based on color (as described below with respect to the banana example) or other indicia of the given product).

At step 580, provide an indication (notice, warning, and/or so forth) to a store employee (e.g., manager, stock person, and/or so forth) that the expiration date has been reached.

FIG. 8 shows an exemplary method 800 for direct communication between the smart shelves system and a consumer, in accordance with an embodiment of the present principles.

At step 805, receive a shopping list of items created by a consumer, by the data processing system 230.

At step 810, determine whether all of the items in the shopping list are available, by the data processing system 230. If so, then the method proceeds to step 810A. Otherwise, the method proceeds to step 820.

Step 810 can include steps 810A-810B.

At step 810A, determine whether each of the items determined to be available are on their respective smart shelf or in a warehouse/holding area, by the data processing system 230. If each of the items determined to be available are on their respective smart shelf, then the method proceeds to step 815. Otherwise, if any of the items determined to be available are in the warehouse/holding area, then the method proceeds to step 810B.

At step 810B, provide an indication (notice, warning, and/or so forth) to a store employee (e.g., manager, stock person, and/or so forth) to move the items in the shopping list that are in the warehouse/holding area to their respective smart shelves, by the data processing system 230.

At step 815, provide an indication to the consumer that all of the items in the shopping list are available, by the data processing system 230. In an embodiment, step 815 can involve provide a total number available units in the store of the given product, for each of the items in the shopping list.

At step 820, provide an indication to the consumer of the items in the shopping list that are available and the items in the shopping list that are not available, by the data processing system 230. In an embodiment, step 820 can involve, for the items in the shopping list that are not available, providing a recommendation to the consumer of similar items, specifying a location in the store of the similar items, and so forth.

At step 825, provide to the customer an optimized route for the consumer to take while in the retail establishment in order to maximize the likelihood that each item on the consumers shopping list will be available during store visit, by the data processing system 230.

Regarding step 810, the determination can be made simply on the items on the shelf or can further be based on items in inventory. It is to be appreciated that the warehouse/holding area can also employ a smart shelve system in accordance with the present principles in order to provide a more definitive response regarding overall store inventory with respect to the determination made at step 810.

Regarding step 820, the indication can be sent to a consumer accessible device such as, for example, but not limited to, a computer, a laptop, a cell phone, a personal digital assistant, a smart watch, and so forth.

FIG. 9 shows an exemplary arrangement of a two-dimensional sensor system 900 in accordance with an embodiment of the present principles.

The sensor system 900 includes a strain sensor arrangement 910 that involves the horizontal and vertical lines shown using a dotted hatch scheme. The sensor system 900 further includes a photodiode color sensor arrangement 920 that involves the diagonal lines shown without a hatch scheme.

FIG. 10 shows another exemplary arrangement of a two-dimensional sensor system 1000 in accordance with an embodiment of the present principles.

The sensor system 1000 includes a strain sensor arrangement 1010 that involves the horizontal and vertical lines shown using a dotted hatch scheme. The sensor system 1000 further includes a photodiode color sensor arrangement 1020 that involves the diagonal lines shown without a hatch scheme. The sensor system 1000 additionally includes a noise/acoustic sensor arrangement 1030 that involves the diagonal thick lines shown in FIG. 10.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Reference in the specification to "one embodiment" or "an embodiment" of the present principles, as well as other variations thereof, means that a particular feature, structure, characteristic, and so forth described in connection with the embodiment is included in at least one embodiment of the present principles. Thus, the appearances of the phrase "in one embodiment" or "in an embodiment", as well any other variations, appearing in various places throughout the specification are not necessarily all referring to the same embodiment.

It is to be appreciated that the use of any of the following "/", "and/or", and "at least one of", for example, in the cases of "A/B", "A and/or B" and "at least one of A and B", is intended to encompass the selection of the first listed option (A) only, or the selection of the second listed option (B) only, or the selection of both options (A and B). As a further example, in the cases of "A, B, and/or C" and "at least one of A, B, and C", such phrasing is intended to encompass the selection of the first listed option (A) only, or the selection of the second listed option (B) only, or the selection of the third listed option (C) only, or the selection of the first and the second listed options (A and B) only, or the selection of the first and third listed options (A and C) only, or the selection of the second and third listed options (B and C) only, or the selection of all three options (A and B and C). This may be extended, as readily apparent by one of ordinary skill in this and related arts, for as many items listed.

Having described preferred embodiments of a system and method (which are intended to be illustrative and not limiting), it is noted that modifications and variations can be made by persons skilled in the art in light of the above teachings. It is therefore to be understood that changes may be made in the particular embodiments disclosed which are within the scope of the invention as outlined by the appended claims. Having thus described aspects of the invention, with the details and particularity required by the patent laws, what is claimed and desired protected by Letters Patent is set forth in the appended claims.

What is claimed is:

1. A system, comprising:
    a set of smart shelves, each having a mesh arrangement of sensors that include strain sensors, photodetectors, microphones, and spillage sensors placed on a bottom thereof to form a sensor mesh layer for generating a signal representative of a product count for a given product to be sold from a corresponding one of the smart shelves;
    a data processing system for transforming the signal from each of the smart shelves into a product count value therefor;
    a set of video displays for displaying characteristics of the given product to be sold from each of the smart shelves; and
    a set of wireless radios for transmitting the characteristics of the given product to be sold from each of the smart shelves to the set of video displays,
    wherein the arrangement of sensors comprises a patterned foil laminated to bottom of a corresponding one of the smart shelves to form a patterned sensor thereon.

2. The system of claim 1, wherein the signal is generated responsive to at least one of a vertical displacement and a lateral displacement of a corresponding one of the smart shelves.

3. The system of claim 1, wherein the patterned foil is formed to include circuits from one or more materials reactive to different phenomena occurring on the corresponding one of the smart shelves.

4. The system of claim 3, wherein the patterned sensor comprises multiple discrete elements to give a desired spatial resolution to the shelf sensor.

5. The system of claim 1, wherein at least one of, the sensors and the set of wireless radios, are powered using at least one of a vibration-based energy scavenging method and a light-based energy scavenging method.

6. The system of claim 1, wherein the data processing system is coupled to store payment registers to detect theft or misplacement of the given product.

7. The system of claim 1, wherein the data processing system monitors the product count for each of the smart shelves and issues a warning to a store employee when the product count falls below a given threshold amount.

8. The system of claim 1, wherein a recommendation of a similar product to the given product is provided on one of the video displays when the given product is unavailable on a corresponding one of the smart shelves.

9. The system of claim 8, wherein an in-store location of the similar product is provided by the one of the video displays when the given product is unavailable on the corresponding one of the smart shelves.

10. The system of claim 1, wherein the data processing system maintains a list of alternatives to the given product, in an order of most similar to least similar, and provides the alternates to the video display for displaying thereon such that if a first alternative is unavailable, a next alternative that is available is displayed on a corresponding one of the video displays.

11. The system of claim 1, wherein the data processing system indicates a total number of available units in the store of the given product responsive to a device provided query for a potential consumer.

12. The system of claim 1, wherein the data processing system determines an optimized route through the store to maximize a likelihood of a consumer finding the given product during a store visit, and provides the optimized route to at least one of a device under the control of the consumer and one of the video displays.

13. The system of claim 1, wherein a shape of individual sections of the mesh arrangement is adapted to a shape of the given product to assist in identifying the given product from another product unintended to be made available for sale on a same one of the smart shelves as the given product.

14. The system of claim 1, further comprising a set of at least one of photodetectors and cameras for capturing color and image data of the given shelf from which the data processing unit determines at least one of a volume of the given product, a shape of the given product, a color of the given product, and an expiration date of the given product.

15. The system of claim 1, wherein the data processing unit receives an expiration date of the given product and provides a user-perceptible indication of product expiration when the expiration date is reached or passed.

16. The system of claim 15, wherein the user-perceptible indication of product expiration is provided at least one of, on one of the video displays and to a store employee.

17. A method, comprising:
    generating a signal representative of a product count for a given product to be sold from a corresponding one of a set of smart shelves, each of the smart shelves in the set having a mesh arrangement of sensors placed on a bottom thereof to form a sensor mesh layer, the mesh arrangement of sensors including strain sensors, photodetectors, microphones, and spillage sensors;
    transforming, by a data processing system, the signal from each of the smart shelves into a product count value therefor; and
    displaying, by a set of video displays, characteristics of the given product to be sold from each of the smart shelves,
    wherein the characteristics of the given product to be sold from each of the smart shelves is transmitted to the set of video displays, by a set of wireless radios,
    wherein the arrangement of sensors comprises a patterned foil laminated to bottom of a corresponding one of the smart shelves to form a patterned sensor thereon.

18. The method of claim 17, wherein the patterned foil is formed to include circuits from one or more materials reactive to different phenomena occurring on the corresponding one of the smart shelves.

19. The method of claim 18, wherein the patterned sensor comprises multiple discrete elements to give a desired spatial resolution to the shelf sensor.

20. A non-transitory article of manufacture tangibly embodying a computer readable program which when executed causes a computer to perform the steps of claim 17.

* * * * *